(12) United States Patent
Matuska et al.

(10) Patent No.: US 7,751,976 B2
(45) Date of Patent: Jul. 6, 2010

(54) ROTARY WING AIRCRAFT FLIGHT CONTROL SYSTEM WITH A PROXIMITY CUEING AND AVOIDANCE SYSTEM

(75) Inventors: David G. Matuska, Shelton, CT (US); Vineet Sahasrabudhe, Hamden, CT (US); Donald S. Anttila, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1349 days.

(21) Appl. No.: 11/213,110

(22) Filed: Aug. 26, 2005

(65) Prior Publication Data

US 2007/0050140 A1    Mar. 1, 2007

(51) Int. Cl.
*G01C 5/00* (2006.01)
(52) U.S. Cl. .......................... 701/301; 701/9
(58) Field of Classification Search ............... 701/9, 701/300–302; 340/945, 961, 963; 342/29; 244/4 R, 7 A; 446/36
See application file for complete search history.

(56) References Cited

U.S. PATENT DOCUMENTS

| 3,979,717 | A | | 9/1976 | Barnum et al. |
|---|---|---|---|---|
| 4,027,838 | A | | 6/1977 | Barnum et al. |
| 4,528,564 | A | | 7/1985 | Trampnau |
| 4,695,013 | A | | 9/1987 | Trampnau |
| 5,371,581 | A | | 12/1994 | Wangler et al. |
| 5,465,142 | A | * | 11/1995 | Krumes et al. ............. 356/5.01 |
| 5,781,126 | A | * | 7/1998 | Paterson et al. ............. 340/970 |
| 6,002,349 | A | | 12/1999 | Greene et al. |
| 6,121,899 | A | | 9/2000 | Theriault |
| 6,422,517 | B1 | | 6/2002 | DeWitt et al. |
| 6,729,576 | B2 | | 5/2004 | Kay et al. |
| 6,761,336 | B2 | | 7/2004 | DeWitt et al. |

* cited by examiner

*Primary Examiner*—Yonel Beaulieu
(74) *Attorney, Agent, or Firm*—Carlson, Gaskey & Olds PC

(57) ABSTRACT

A method of obstacle avoidance for a rotary wing aircraft includes detecting an obstacle proximate to the aircraft and commanding a servo to generate a force to an input control device in a direction that tends to preclude the aircraft from contacting the detected obstacle, the command having lesser authority than a pilot input command.

15 Claims, 3 Drawing Sheets

ROTARY WING AIRCRAFT FLIGHT CONTROL SYSTEM WITH A PROXIMITY CUEING AND AVOIDANCE SYSTEM

BACKGROUND OF THE INVENTION

The present invention relates to an obstacle avoidance system. More particularly, the present invention relates to an obstacle avoidance system, which may be incorporated into the flight control system of a rotary wing aircraft to minimize the likelihood that a portion of the aircraft will contact a detected obstacle.

Various systems have been developed to minimize the likelihood that a rotary wing aircraft will contact obstacles, such as telephone lines, etc., while flying at low levels. Current techniques include active electronic systems such as microwave and millimeter wave radar systems, passive systems which detect the magnetic flux from a live transmission line, and mechanical systems which cut the wires upon contact.

Other systems are designed to warn pilots of ground obstacles that may be located around the periphery of the rotary-wing aircraft during, for example, hover, landing, etc. For example, in one such system, a laser is directed in a circular pattern about the bottom of the aircraft's fuselage to detect obstacles and provide an audible and/or visible alert. Disadvantageously, these ground obstacles alert systems may be just one of many warning systems incorporated into the aircraft such that the pilot may miss the alert during high workload situations during which the pilot must scan multiple flight instruments while visually observing the outside environment or landing zone.

Accordingly, it is desirable to provide an obstacle cueing and avoidance system which provides a force feedback to minimize the likelihood of inadvertent contact with an obstacle.

SUMMARY OF THE INVENTION

An obstacle avoidance system according to the present invention may include an input control device, a sensor suite, and a communication feedback loop. The input control device is preferably operable to create a first force, while the sensor suite is configured to detect nearby obstacles, and the communication feedback loop is in communication with the input control device and the sensor suite so that said communication feedback loop is operable to generate a command signal in response to detection of a nearby obstacle. The command signal being operable to cause, for example, an actuator to generate a second force different from said first force.

The obstacle avoidance system of the present invention is preferably used in combination with an apparatus, such as a rotary wing aircraft, wherein the input control device at least partially controls the movement of the apparatus in response to a user's input. The user's input tending to cause the first force to move the apparatus in a first direction. The sensor suite being preferably mounted to the apparatus in order to detect nearby obstacles which may contact the apparatus if the apparatus is moved in the first direction. The communication feedback loop at least partially augmenting the user's input such that the second force tends to preclude the apparatus from moving in the first direction and thus tends to preclude the apparatus from contacting the detected obstacle. More preferably, the second force tends to cause the apparatus to move in a second direction different from the first direction and away from the detected obstacle.

As previously mentioned, the obstacle avoidance system is preferably used on a rotary wing aircraft, the aircraft including a fuselage, a main rotor system and a tail, which may include a tail rotor system. The sensor suit preferably defines a field of view adjacent to the aircraft in order to detect an obstacle, for example, another aircraft, a tree, electrical wires, etc., that may come into contact with the aircraft, for example, with the aircraft's main rotor blades, tail rotor blades, etc. The communication feedback loop is preferably incorporated into the aircraft's flight control system such that the command signal is operable to cause a force to be generated, which in turn, tends to preclude the aircraft from moving in the first direction and thus tends to preclude the aircraft from contacting the detected obstacle. More preferably, the second force tends to cause the aircraft to move in a second direction different from the first direction and away from the detected obstacle.

The present invention may include a rotary-wing aircraft incorporating an input control device for controlling movement of the aircraft in response to a pilot's input, the pilot's input tending to cause the aircraft to move in a first direction, a sensor suite mounted to the aircraft for detecting nearby obstacles, a flight control system for at least partially augmenting the pilot's input, and an obstacle avoidance system in communication with said flight control system and said sensor suite, said obstacle avoidance system operable to generate a command signal in response to detection of a nearby obstacle, wherein the command signal tends to preclude the aircraft from moving in the first direction. Preferably, the command signal results in the aircraft moving in a second direction substantially opposite to the first direction.

Furthermore, the rotary-wing aircraft may include an extending tail having a tail rotor system mounted thereto, the sensor suite generating a field of view about the tail rotor system to cover a path along which the tail rotor system may move so that the command signal results in the tail rotor system moving in a second direction substantially opposite to the first direction.

Alternatively, the rotary-wing aircraft may include a main rotor system, the sensor suite generating a field of view about the main rotor system to cover a path along which the main rotor system may move so that the command signal results in the main rotor system moving in a second direction substantially opposite to the first direction.

The present invention may include a flight control system having an obstacle cueing and avoidance system, which is integrated into the flight control system to provide a force feedback to an input control device, such as, for example, anti-torque pedals, a flight control stick, etc. The obstacle cueing and avoidance system preferably includes a proximity sensor suite located on the aircraft so that the sensor suite provides a field of view about the aircraft to monitor a path along which the aircraft may travel. For example, the sensor suite may provide a field of view about the aircraft to detect any nearby obstacles as the aircraft is yawed, pitched, rolled, collectively climbed or descended, etc. By way of an example only, the sensor suite may be mounted to the tail of the rotary wing aircraft so that the proximity sensor suite provides a field of view about the tail to monitor a path along which the tail may travel.

In an aircraft flight control system that utilizes a partial authority flight control system, when the proximity sensor suite detects an obstacle within the field of view, the proximity sensor suite produces a proximity signal which is communicated to the obstacle cueing and avoidance system. If the obstacle cueing and avoidance system determines that the aircraft, for example, the fuselage, the main rotor system, the tail, the tail rotor system, etc., is in risk of contacting the obstacle, the obstacle cueing and avoidance system produces and transmits a command signal to a servo which is opposite to that of the pilot's input signal, which may otherwise direct the aircraft into the obstacle. Thereafter, the servo produces a feedback force to the input control device opposite that of the pilot's input.

In response to the feedback force provided to the input control device generated by the servo, the pilot is provided with a cue to minimize, negate, or reverse the pilot's input, such that the servo tends to preclude the aircraft from moving in a direction towards the obstacle. That is, the feedback force counteracts the pilot's input so that the aircraft tends not to move. Alternatively, the servo may operate to move the aircraft in a direction away from the obstacle. The obstacle cueing and avoidance system may also be combined with an audible and/or visual warning.

In an aircraft flight control system that utilizes a full authority Fly-By-Wire (FBW) control system, the obstacle cueing and avoidance system produces a command signal which is communicated to a servo as well as to a FBW control law logic. As with the partial authority system, the servo generates an input to essentially stiffen the input control device to provide a feedback cue to the pilot in a direction, which tends to preclude the aircraft from moving in a direction towards the obstacle. That is, the feedback counteracts the pilot's input so that the aircraft tends not to move. Alternatively, the servo may generate an input that tends to move the aircraft in a direction away from the detected obstacle so as to minimize the likelihood of obstacle contact. In addition, as the FBW control system provides full authority through control laws, the obstacle cueing and avoidance system will appropriately limit or "shape" the pilot's input so as to tend to preclude the aircraft from contacting the detected proximate obstacle.

The present invention therefore provides an obstacle avoidance system for minimizing the likelihood of inadvertent contact between an apparatus and an obstacle. More particularly, the present invention provides an obstacle cueing and avoidance system for a rotary-wing aircraft flight control system that provides a force feedback to a pilot to minimize the likelihood of inadvertent contact between the aircraft and the obstacle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Although the present invention will be described in terms of an obstacle avoidance system for use with a rotary wing aircraft in order to minimize the likelihood of contact between the aircraft, specifically the tail of the rotary wing aircraft, and a nearby obstacle, the present invention is easily adaptable to prevent contact between a nearby obstacle and any other portion of the aircraft, for example, the fuselage, main rotor system, tail rotor system, etc. It should be further understood that the present invention is also easily adaptable for use with other apparatuses, structures, etc. where avoidance of contact with a nearby obstacle is desired.

The present invention is directed to an obstacle avoidance system. Preferably, as will be described in greater detail below, the obstacle avoidance system includes an input control device, which may be in the form, for example, of anti-torque pedals, a flight control stick, etc. The input control device being operable to create a force to move an apparatus, for example, an aircraft, in a desired direction in response to a user's input. The obstacle avoidance system also preferably includes a sensor suite, as will be described in greater detail later on. The sensor suite is preferably mounted to the apparatus for detecting nearby obstacles. The obstacle avoidance system also preferably includes a communication feedback loop, for example, a flight control system, as will be described in greater detail below. The communication feedback loop is preferably in communication with the input control device and the sensor suite so that the communication feedback loop is operable to generate a command signal in response to detection of a nearby obstacle. The command signal preferably causes an actuator to generate a second force different from the first force so that the actuator tends to preclude the apparatus from moving in the first direction and thus tends to preclude the apparatus from contacting the detected obstacle. More preferably, the second force tends to cause the apparatus to move in a second direction different from the first direction and away from the detected obstacle.

Figure 1:
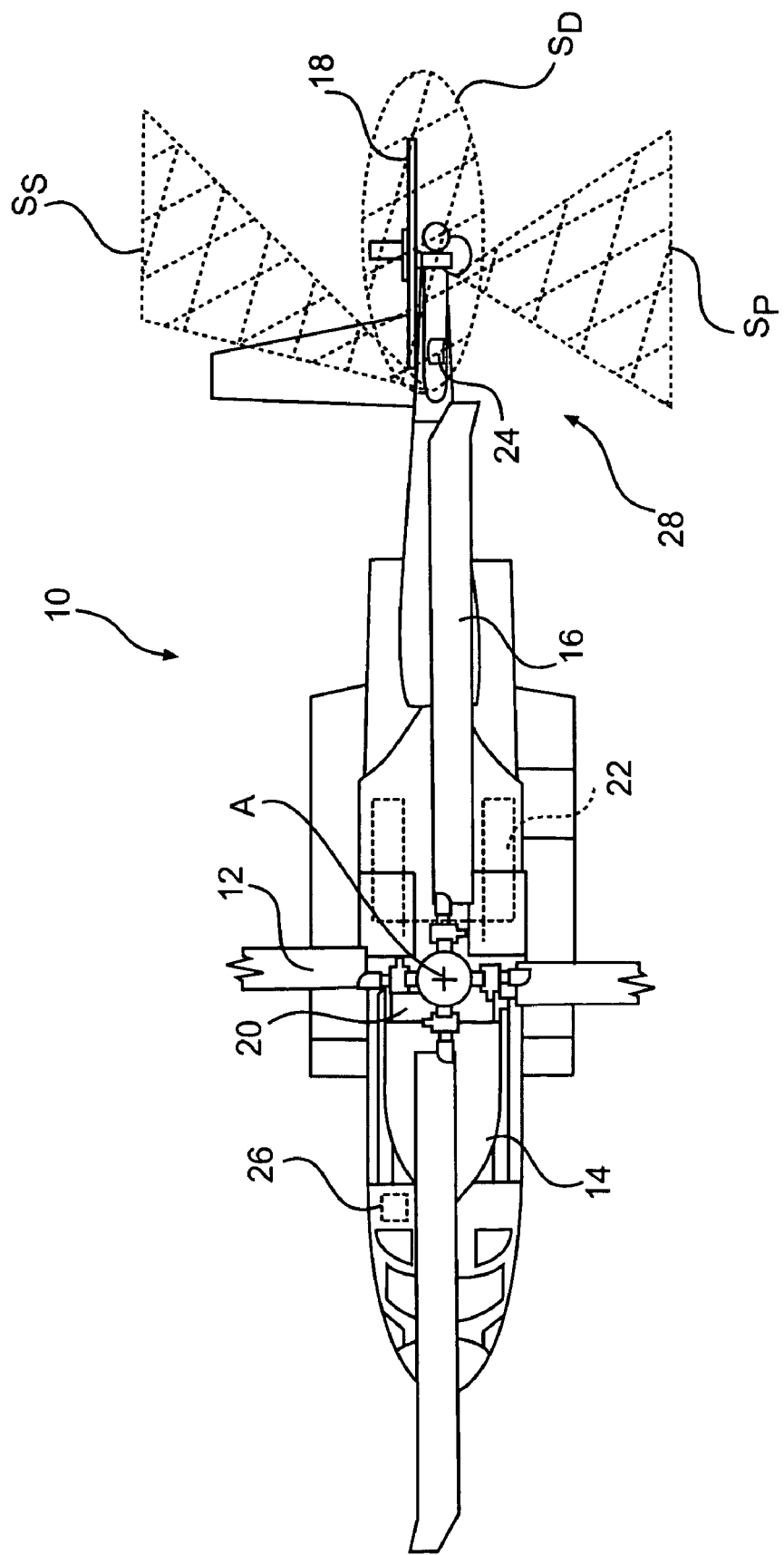
FIG. 1 is a general top view of an exemplary rotary wing aircraft embodiment for use with the present invention.

As schematically illustrated in FIG. 1, the apparatus may be in the form of a rotary-wing aircraft 10. The aircraft 10 generally includes a fuselage 14, a main rotor system 12 and an extending tail 16, which may include a tail rotor system such as an anti-torque tail rotor 18, a rotor propulsion system, etc. The main rotor system 12 may be driven about an axis of rotor rotation A through a transmission (illustrated schematically at 20) by one or more engines 22. Although a particular helicopter configuration is illustrated and described in the disclosed embodiment, other configurations and/or machines, such as turbo-props, tilt-rotor and tilt-wing aircraft, will also benefit from the present invention.

The aircraft 10 preferably also include an aircraft flight control system 26 (schematically illustrated in FIGS. 2A and 2B) having an obstacle cueing and avoidance system 24 integrated therewith. The obstacle cueing and avoidance system 24 preferably includes a proximity sensor suite 28 located anywhere on the aircraft 10. As illustrated, for example, the sensor suite 28 may be located within the extending tail 16. As such, the proximity sensor suite 28 provides a field of view about the extending tail 16 adjacent the tail rotor system 18, preferably along a path on which the tail rotor 18 may travel as the aircraft 10 moves. For example, the pilot may cause the aircraft to yaw, pitch, roll, translate, ascend or descend. It should be understood that other sensor mounting locations may also be utilized with the present invention to permit detection adjacent other aircraft systems such as the main rotor system 12, landing gear, etc. For example, the sensor suites 28 may be located on or adjacent to the fuselage 14 in order to detect nearby obstacles to the main rotor system 12.

The proximity sensor suite 28 preferably includes one or more sensor types, and one or more sensor locations to provide a significant field of view while minimizing false detection. As illustrated, the field of view may be a conical field of view extending from the fuselage 14 and/or the tail 16. For example, the field of view may extend from the bottom, the top, the front, the back and the sides of the aircraft 10 on a path along which the aircraft may travel. As another example, for detecting obstacles in the proximity of the tail rotor 18, the sensor suite 28 may include a port directed sensor field of view Sp, a starboard directed sensor field of view Ss, a downward directed field of view Sd, a rearward directed field of view Sr, an upward directed field of view Su, or any combinations thereof. It should be understood that the fields of view are depicted schematically and that various emission patterns may be used with the present invention. Furthermore, the fields of view may be selectively activated in response to predefined conditions such as airspeed, input, altitude, etc. so that the sensor suite 28 minimizes emissions.

The proximity sensor suite 28 may include sensors, which operate through infrared, laser radar, microwave technology, millimeter radar, echolocation detection, combinations thereof, etc. Microwave technology preferably combines both doppler processing and pulse waveforms to detect both moving (i.e., other aircrafts, etc.) and stationary (i.e., wires, trees, etc.) obstacles. Sector scan coverage provides estimates of the sector in which the intrusion is occurring, and may be incorporated with other complementary sensors, such as echolocation.

False alarms may be reduced by correlating sensed obstacles from one sensor with sensed obstacles from other incorporated, complementary sensors in the proximity sensor suite 28. That is, complimentary sensor technology is alternatively or additionally utilized such as, for example only, combining an infrared sensor to correlate the existence of an obstacle that has been sensed by a microwave, laser, and/or acoustic sensor. Spectral and time domain filtering of acoustic signatures as derived from echolocation is additionally or alternatively performed to correlate the transmitted spectrum with the received signature.

Figure 2A:
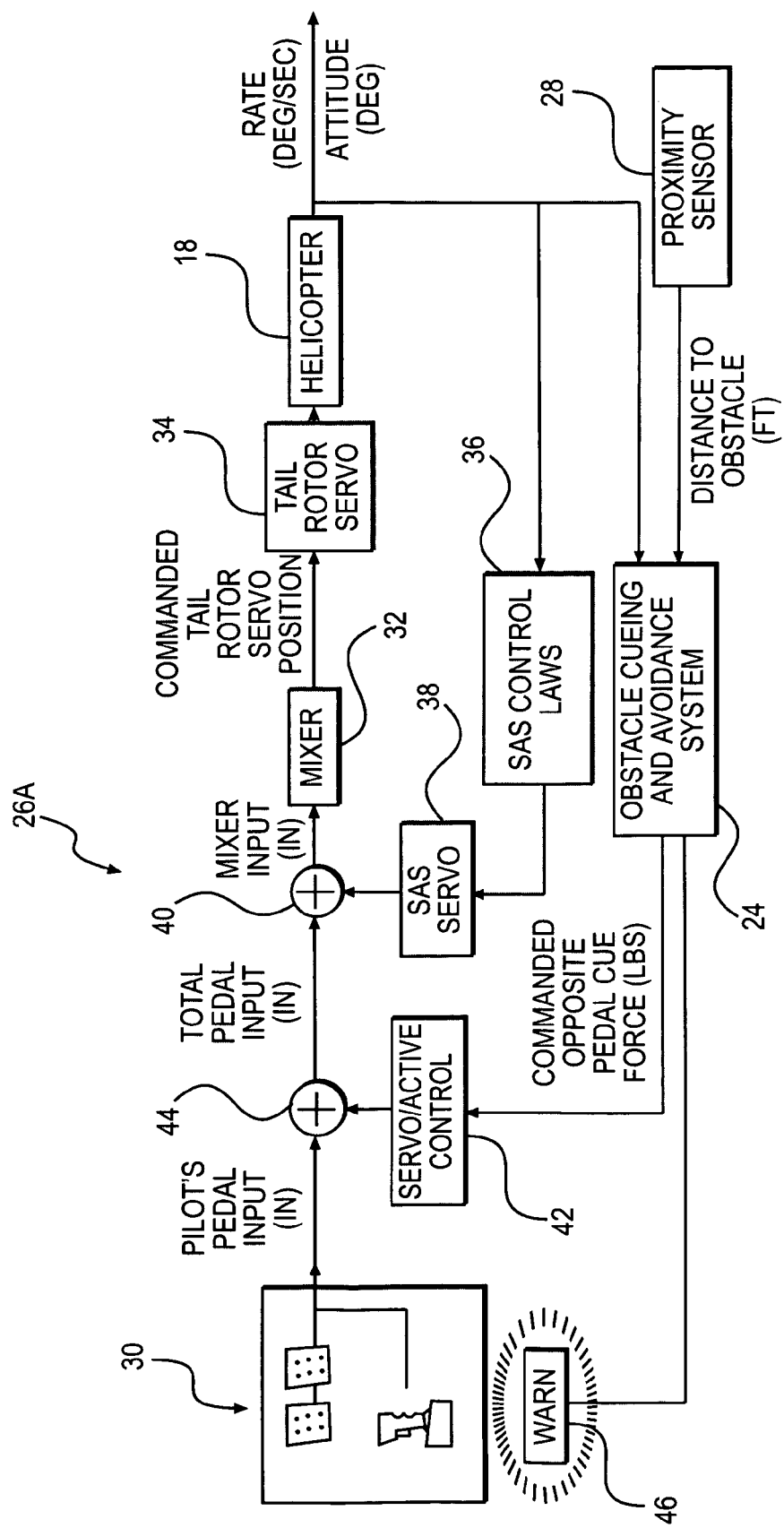
FIG. 2A is a block diagram of a partial authority flight control system with an obstacle cueing and avoidance system of the present invention.

Referring to FIG. 2A, the aircraft flight control system 26 may be a partial authority flight control system 26A which generally includes a full authority mechanical connection from the pilot control inceptor to the aircraft flight controls and a partial authority (typically, for example, 10%) Stability Augmentation System (SAS) servomechanism. Currently, in contrast to airplanes, many rotary wing aircraft utilize mechanically or hydro-mechanically controlled flight controls systems. The flight control partial authority SAS of the flight control system on such rotary wing aircraft provides limited refinement of pilot input.

In the partial authority flight control system 26A, the pilot may provide aircraft control input through the input control device 30, which may be in the form of anti-torque pedals, a control stick, etc. The pilot's input may be communicated to a mixer 32, which drives an aircraft flight control through a flight control drive servo 34. The flight control drive servo 34, in the disclosed, non-limiting embodiment, controls the pitch of the tail rotor 18 flight control to thereby move the aircraft 10 at a commanded rate.

The partial authority flight control system 26A may feed back the rate through the SAS control law logic 36, which then drives an SAS servo 38, which generates a force that is directly added to the pilot's input at an adder 40. The combined signal from the pilot's input plus the SAS servo's 38 input are mixed at the mixer 32 to modify the pilot's input in accordance with the SAS control law logic 36 to generally increase aircraft stability and increase control fidelity. As is typical with partial authority flight control systems 26A, the SAS control law logic 36 and the SAS servo 38 provides limited refinement to the pilot's input, such as, for example, approximately 10% of the total authority provided to the pilot by the primarily mechanical flight controls.

In operation, should the proximity sensor suite 28 sense an obstacle within the sensor suite's field of view, the proximity sensor suite 28 produces a proximity signal, such as a distance to an obstacle, which is communicated to the obstacle cueing and avoidance system 24. From the proximity signal, the obstacle cueing and avoidance system 24 determines whether the aircraft 10, for example only, whether the tail rotor 18, is at risk of contacting the detected obstacle through preprogrammed algorithms which utilize the proximity signal in combination with flight information, such as, for example only, the pilot's input, the commanded rate, altitude, airspeed, etc. If the obstacle cueing and avoidance system 24 determines that the aircraft is at risk for contacting the obstacle, the obstacle cueing and avoidance system 24 produces a command signal, which may be opposite to that of the pilot's input signal, to a servo 42. The servo 42 produces a force in the input control device 30, preferably opposite to the pilot's input signal by summing the servo 42 with the pilot's input through an adder 44. In other words, the total input is some combination of the pilot's input signal and the force generated by the servo 42.

For example, if the pilot is inputting right pedal and the obstacle cueing and avoidance system 24 determines that an obstacle will be in the path of the aircraft 10 if such input is carried forward, the obstacle cueing and avoidance system 24 will generate a left pedal input to essentially stiffen the right pedal input in the input control device 30 to provide a force feedback to the pilot which cues the pilot that the pilot initiated input is directed toward an obstacle. The obstacle cueing and avoidance system 24 may also be combined with an audible and/or visual warning through an output 46.

In response to the feedback force provided to the input control device 30 generated by the servo 42, the pilot will likely minimize the input, such as by letting up on the right pedal input in the example above, such that the input generated by the obstacle cueing and avoidance system and transmitted to the servo 42 will drive the aircraft 10, for example only, the tail rotor 18, in a direction away from the obstacle. That is, when the pilot lets up on the potentially striking inducing right pedal input, the input from the servo 42 moves the aircraft 10 away from the detected obstacle.

Figure 2B:
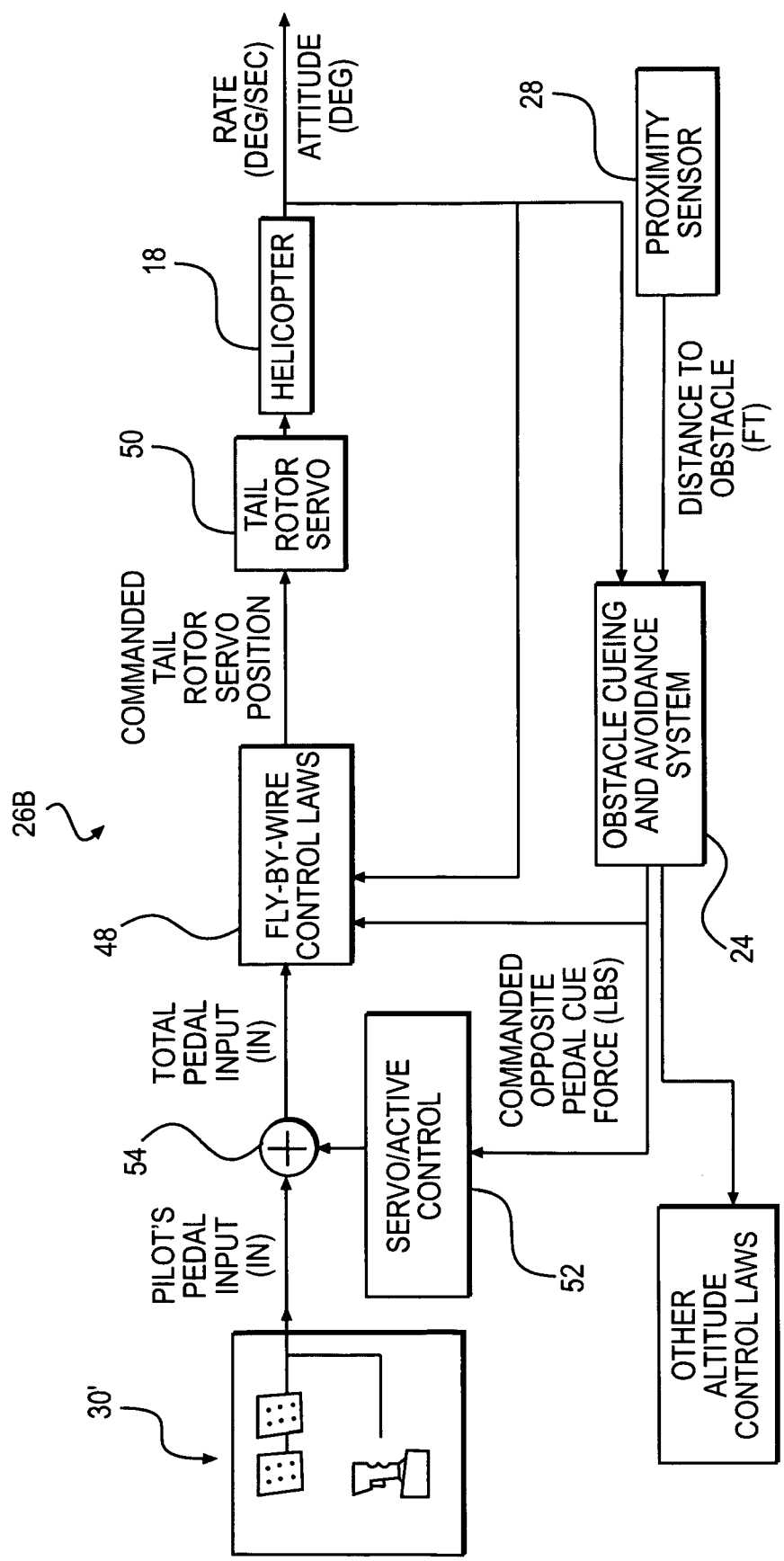
FIG. 2B is a block diagram of a full authority flight control system with an obstacle cueing and avoidance system of the present invention.

Referring to FIG. 2B, the aircraft flight control system 26 may be a full authority fly-By-Wire (FBW) control system 26B that utilizes signals to convey pilot intentions directly to the flight control servos. In the FBW control system 26B, a pilot may provide the aircraft 10, for example only, the tail rotor 18, input through an input control device 30', such as a pedal, a control stick, etc. The pilot's input is communicated to an FBW control law logic 48 to directly drive a fight control though a flight control drive servo 50. The flight control drive servo 50, in the disclosed, non-limiting embodiment, controls the pitch of the tail rotor 18 flight control to move the aircraft 10 at a commanded rate.

The FBW control law logic 48 receives aircraft rate and attitude response feedback directly so as to modify the pilot's input to actively control the aircraft's response. As generally understood, FBW systems may provide such feedback mechanisms utilizing linear control system logic, such as proportional, integral, or derivative (PID) paths to achieve a desired response and to compensate for undesired destabilization forces acting on the aircraft in the particular axis. It should be understood that FBW control law logic theory may be incorporated through a multiple of flight control systems.

The aircraft rate and attitude response feedback is preferably also fed directly to the obstacle cueing and avoidance system 24. The obstacle cueing and avoidance system 24 preferably also receives the proximately signal from the proximity sensor suite 28 as described above. If the obstacle cueing and avoidance system 24 determines that the aircraft 10, for example only, the tail rotor 18, is at risk of contacting the detected obstacle, the obstacle cueing and avoidance system 24 produces a command signal which is communicated to a servo 52 as well as to the FBW control law logic 48. That is, the command signal produced by the obstacle cueing and avoidance system 24 is incorporated as feedback into the FBW control law logic 48.

If the obstacle cueing and avoidance system 24 determines that the aircraft 10 is at risk for contacting the obstacle, the obstacle cueing and avoidance system 24 produces a command signal through the servo 52, which may be opposite of the pilot's signal. Thereafter, the servo 52 produces a force in the input control device 30' preferably opposite to the pilot's input by summing the servo 52 with the pilot's input through an adder 54. As with the partial authority system, the servo 52 generates an opposite input to essentially stiffen the input control device 30' to provide force feedback to the pilot in a direction which will move the aircraft, for example only, the tail rotor 18, away from the detected obstacle to minimize the likelihood of obstacle contact.

In addition, as the FBW control system 26B provides full authority through control laws, the obstacle cueing and avoidance system 24 will appropriately limit or "shape" the pilot control input provided to, for example, flight control drive servo 50 so as to as to avoid the proximate obstacle. That is, the FBW control system 26B provides feedback forces to the pilot as well as shapes the commanded tail rotor position to prevent the pilot's input, which could drive the aircraft 10 into the detected obstacle.

The FBW control system 26B may additionally be integrated with other control laws, for example only, to increase the aircraft altitude in response to a pilot's command input which is not alleviated in response to force feedback from the obstacle cueing and avoidance system 24. For example, the obstacle cueing and avoidance system 24 would communicate with an altitude FBW control law logic within a primary flight control computer to increase aircraft altitude to clear the detected obstacle such that a pilot's command input can then be effectuated such that the aircraft 10 is essentially moved over the detected obstacle.

It should be understood that the obstacle cueing and avoidance system described above can alternatively produce a command signal which is in communication with any other control servo, such as, for example, a cyclic servo, a collective servo, etc. to generate an input to provide feedback to the pilot in a direction which would tend to preclude the aircraft from moving closer to the detected obstacle. This includes tactile feedback control signal to the pilot to communicate to the pilot the impending danger of continuing aircraft motion in a manner which allows the aircraft to move closer to the detected obstacle.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of obstacle avoidance for a rotary wing aircraft comprising:
   detecting an obstacle proximate to the aircraft; and
   commanding a servo to generate a force to an input control device in a direction that tends to preclude the aircraft from contacting the detected obstacle, the command having lesser authority than a pilot input command.

2. The method as recited in claim 1, wherein the generated force causes the aircraft to move in a direction away from the detected obstacle.

3. The method as recited in claim 1, further comprising:
   determining whether the aircraft is at risk for contacting the detected obstacle.

4. The method as recited in claim 1, further comprising:
   commanding the force in opposition to a pilot input command.

5. The method as recited in claim 4, further comprising:
   commanding the force through the servo, the force added to the pilot input command.

6. A method of obstacle avoidance for a rotary wing aircraft comprising the steps of:
   detecting an obstacle proximate to the aircraft;
   generating a command from an obstacle cueing and avoidance system; and
   commanding a servo to generate a force to an input control device in a direction that tends to preclude the aircraft from contacting the detected obstacle, the command having lesser authority than a pilot input command.

7. A method as recited in claim 6, further comprising:
   summing the command from the servo and the pilot input command with a command from a stability augmentation servo.

8. A method of obstacle avoidance for a rotary wing aircraft comprising the steps of:
   detecting an object proximate to the rotary-wing aircraft; and
   shaping an FBW control law of a FBW flight control system which controls a flight control drive servo to avoid the detected obstacle; and
   commanding a servo to generate a force to an input control device in a direction that tends to preclude the aircraft from contacting the detected obstacle, the command having lesser authority than a pilot input command.

9. The method as recited in claim 8, further comprising:
   communicating a proximity command from an obstacle cueing and avoidance system to the FBW flight control system and the sensor suite; and
   shaping the FBW control law of the FBW flight control system to control the flight control drive servo to prevent a pilot command from driving the aircraft into the obstacle.

10. The method as recited in claim 1, further comprising:
    controlling a flight control drive servo to preclude the aircraft from contacting the detected obstacle.

11. The method as recited in claim 10, further comprising:
    shaping a FBW control law of a FBW flight control system to control the flight control drive servo to prevent a pilot command from driving the aircraft into the detected obstacle.

12. A method as recited in claim 6, further comprising:
    summing the command from the servo and the pilot input command.

13. The method as recited in claim 1, further comprising:
    generating a warning through an output in response to detecting the obstacle proximate to the aircraft.

14. The method as recited in claim 1, further comprising:
commanding the servo to generate the force to the input control device in the direction that tends to preclude the aircraft from contacting the detected obstacle to provide a force feedback within the input control device which cues the pilot that a pilot input is directed toward the directed obstacle.

15. A method of obstacle avoidance for a rotary wing aircraft comprising:
detecting an obstacle proximate to the aircraft;
commanding a servo to generate a force to an input control device in a direction that tends to preclude the aircraft from contacting the detected obstacle; and
shaping a FBW control law of a FBW flight control system to control a flight control drive servo to prevent a pilot command from driving the aircraft into the detected obstacle.

* * * * *